(12) United States Patent  (10) Patent No.: US 8,831,158 B2
Huostila et al.  (45) Date of Patent: Sep. 9, 2014

(54) SYNCHRONOUS MODE TRACKING OF MULTIPATH SIGNALS

(71) Applicant: Broadcom Corporation, Irvine, CA (US)

(72) Inventors: Ari Huostila, Poway, CA (US); Chun-Hsuan Kuo, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 71 days.

(21) Appl. No.: 13/625,256

(22) Filed: Sep. 24, 2012

(65) Prior Publication Data

US 2013/0259104 A1   Oct. 3, 2013

Related U.S. Application Data

(60) Provisional application No. 61/617,253, filed on Mar. 29, 2012, provisional application No. 61/676,013, filed on Jul. 26, 2012.

(51) Int. Cl.
*H04L 7/00*   (2006.01)

(52) U.S. Cl.
USPC ............................ 375/355; 341/123; 341/126

(58) Field of Classification Search
CPC ..... H04L 7/0034; H04L 7/033; H04L 7/0029; H04L 7/0331; H03L 7/091; H03M 1/001; H03M 1/004; H03M 2201/51; H03M 2201/4233; H03M 2201/11; H03M 2201/20; H03M 1/121; H03M 1/123; H03M 1/124; H03M 1/1245; H03M 1/1255; H03M 1/126
USPC .................. 375/354, 355; 341/122, 123, 126
See application file for complete search history.

(56) References Cited

U.S. PATENT DOCUMENTS

| 8,379,694 | B2 * | 2/2013 | Li ................................ 375/147 |
| 2002/0131536 | A1 * | 9/2002 | Veillette ........................ 375/347 |
| 2004/0017847 | A1 | 1/2004 | Alberth et al. |
| 2004/0153679 | A1 | 8/2004 | Fitton et al. |
| 2005/0077934 | A1 | 4/2005 | Fahim |
| 2005/0227660 | A1 | 10/2005 | Hashemi et al. |
| 2005/0253632 | A1 | 11/2005 | Fahim |
| 2006/0088125 | A1 | 4/2006 | Miyatani et al. |
| 2006/0121869 | A1 | 6/2006 | Natarajan et al. |
| 2006/0146918 | A1 * | 7/2006 | Black et al. .................... 375/148 |
| 2007/0081606 | A1 | 4/2007 | Rosenfeld |
| 2008/0016381 | A1 | 1/2008 | Fitton et al. |
| 2008/0037662 | A1 | 2/2008 | Ravi et al. |
| 2008/0058019 | A1 | 3/2008 | Natarajan et al. |
| 2008/0069252 | A1 | 3/2008 | Wenzhen et al. |

(Continued)

OTHER PUBLICATIONS

U.S. Appl. No. 61/617,253 entitled "Asic Processing," filed Mar. 29, 2012.

(Continued)

*Primary Examiner* — Dac Ha
(74) *Attorney, Agent, or Firm* — McDermott Will & Emery LLP

(57) ABSTRACT

In one embodiment, a method comprising sampling by a first sampling unit a first signal received via a first antenna; and sampling by a second sampling unit a second signal received via a second antenna, the sampling of the second signal commencing in synchronization with the sampling of the first signal by the first sampling unit based on an accumulated value, the first and second signal sharing common information.

19 Claims, 6 Drawing Sheets

(56) References Cited

U.S. PATENT DOCUMENTS

| | | |
|---|---|---|
| 2008/0075158 A1 | 3/2008 | Li |
| 2008/0075189 A1 | 3/2008 | Li et al. |
| 2008/0075208 A1 | 3/2008 | Li et al. |
| 2008/0075216 A1* | 3/2008 | Li et al. .................. 375/355 |
| 2008/0095141 A1 | 4/2008 | Kong et al. |
| 2008/0130809 A1* | 6/2008 | Kong et al. ............... 375/355 |
| 2008/0240170 A1 | 10/2008 | Elmala et al. |
| 2008/0307240 A1 | 12/2008 | Dahan et al. |
| 2009/0013114 A1 | 1/2009 | Sanders |
| 2009/0036064 A1 | 2/2009 | Ravi et al. |
| 2009/0041108 A1 | 2/2009 | Degani et al. |
| 2009/0091362 A1 | 4/2009 | Pellerano et al. |
| 2009/0168843 A1 | 7/2009 | Waters et al. |
| 2009/0204831 A1 | 8/2009 | Cousson et al. |
| 2010/0036211 A1 | 2/2010 | La Rue et al. |
| 2010/0149040 A1 | 6/2010 | Ruelke et al. |
| 2010/0171659 A1 | 7/2010 | Waters et al. |
| 2010/0195566 A1 | 8/2010 | Krishnamurthy et al. |
| 2010/0260154 A1 | 10/2010 | Frank et al. |
| 2011/0043386 A1 | 2/2011 | Kong et al. |
| 2011/0149868 A1 | 6/2011 | Krishnamurthy et al. |
| 2011/0149903 A1 | 6/2011 | Krishnamurthy et al. |
| 2012/0113844 A1 | 5/2012 | Krishnamurthy et al. |
| 2012/0113961 A1 | 5/2012 | Krishnamurthy et al. |
| 2012/0122440 A1 | 5/2012 | Krishnamurthy et al. |
| 2012/0122472 A1 | 5/2012 | Krishnamurthy et al. |
| 2012/0139592 A1 | 6/2012 | Bo et al. |
| 2012/0185722 A1 | 7/2012 | Sanders |

OTHER PUBLICATIONS

U.S. Appl. No. 61/676,013 entitled "Synchronous Mode Tracking of Multipath Signals," filed Jul. 26, 2012.

* cited by examiner

SYNCHRONOUS MODE TRACKING OF MULTIPATH SIGNALS

CROSS REFERENCE TO RELATED APPLICATIONS

This application claims priority to U.S. provisional applications entitled, "ASIC Processing," having Ser. No. 61/617,253, filed Mar. 29, 2012, and "Synchronous Mode Tracking of Multipath Signals," having Ser. No. 61/676,013, filed Jul. 26, 2012, both which are entirely incorporated herein by reference.

TECHNICAL FIELD

The present disclosure is generally related to processing of multipath signals.

BACKGROUND

A base transceiver station (BTS) transmits a radio frequency (RF) signal, which may be reflected, and/or attenuated by various obstacles and surrounding objects while propagating though a transmission medium. Each of these reflections forms an individual distinct path, or path. As a result, a mobile receiver receives a plurality of individual distinct versions of the transmitted signal, at a plurality of distinct time instants. Each of the received plurality of individual distinct versions of the transmitted signal is associated with an individual distinct path and is referred to as an individual distinct path signal. A time instant associated with an individual distinct path signal, and a time instant associated with a subsequent individual distinct path signal relate to the time offset of receipt of these individual distinct path signals. Several of the plurality of individual distinct path signals may be received at a received signal power level that may vary among the received plurality of individual distinct path signals. A time offset may vary among the received plurality of individual distinct path signals. For example, a time offset associated with an $n^{th}$ individual distinct path signal, and an $(n+1)^{th}$ individual distinct path signal, may differ from a time offset associated with an $m^{th}$ individual distinct path signal, and a $(m+1)^{th}$ individual distinct path signal, for $m \neq n$. A measure of a time offset may be referred to as temporal proximity.

The plurality of individual distinct path signals that may be received at the mobile receiver may be referred to as multipath signals, or a multipath. A medium through which a transmitted RF signal may be propagated is referred to as the RF channel, or a channel. Transmission impairments, or impairments, may be present in the channel that may introduce distortion, interference, and/or distortion as the transmitted RF signal propagates through the channel. The presence of transmission impairments may increase the difficulty of recovering a transmitted RF signal at a mobile receiver based on corresponding received multipath signals. The channel may be characterized by its RF bandwidth and whether the channel comprises a single path, or a multipath (frequency selective fading channel). A channel that comprises a single path may be referred to as a "frequency flat fading channel." A channel that comprises a multipath may be referred to as a "frequency selective fading channel."

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
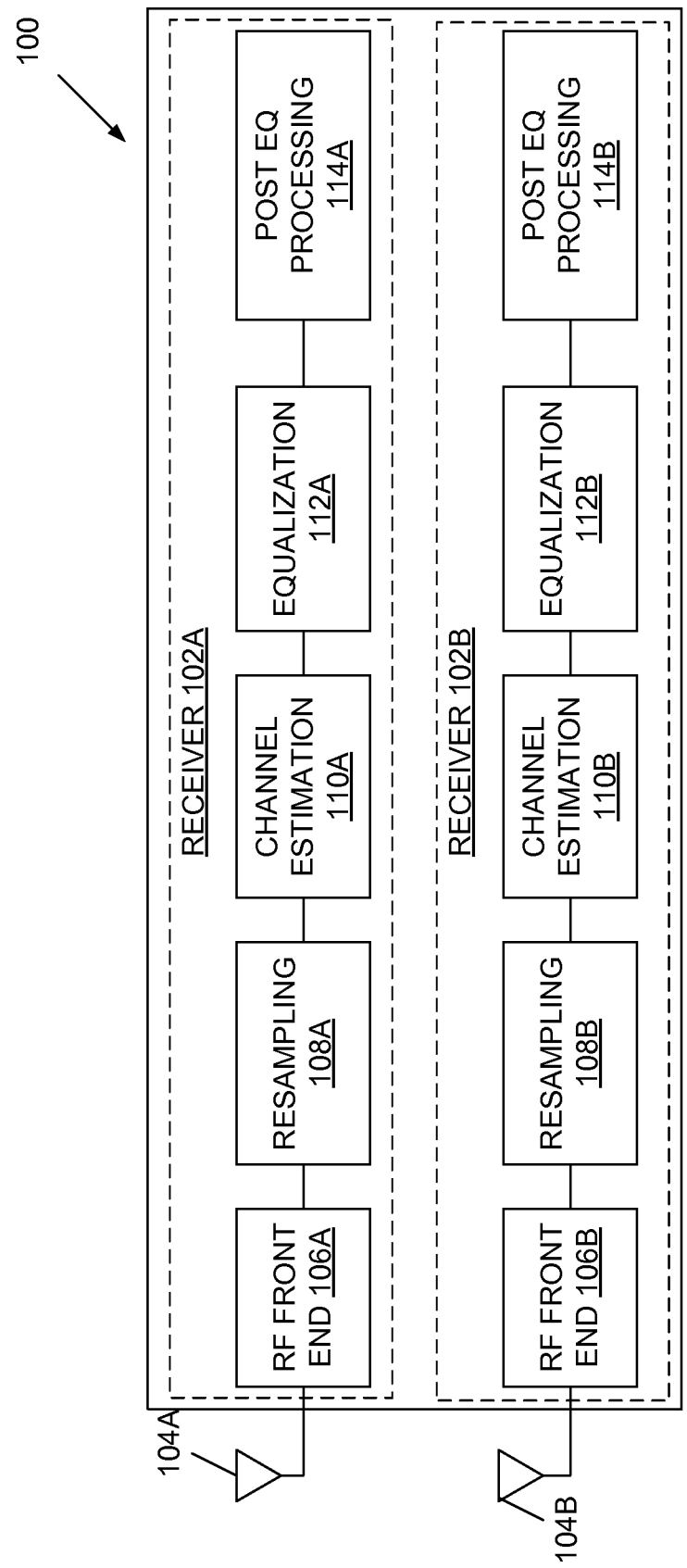
FIG. 1 is a block diagram of an example environment in which an embodiment of a synchronous mode tracking system may be employed.

Disclosed herein are certain embodiments of synchronous mode tracking systems and methods that synchronize the sampling of multipath signals received in a multi-antenna receiver system, or generally, communication system. In one embodiment, multiple, independently operating receiver systems receive multipath signals carrying information via multiple antennas. Signals received via one antenna are sampled by one sampling unit based on input from a tracking component, such as a delay lock loop. The signals are sampled over one or more (extended) correlation or chip windows, wherein the difference in sampling points is accumulated by an accumulator during the one or more correlation windows. Responsive to channel conditions (e.g., poor signal quality, etc.), a second antenna is enabled to receive signals, where the signals are sampled by a second sampling unit that commences (and continued thereafter) in synchronization with the first sampling unit. The commencement of the second sampling unit occurs after the one or more sampling windows, and is based on inputs from the delay lock loop and the accumulator to enable the synchronization, according to a programmed initial starting sampling point. One or more embodiments of synchronous mode tracking systems may be used to enable receiver diversity where a new sampling subsystem may be started at any time to monitor an additional antenna input.

In contrast, conventional systems typically use a respective delay lock loop for each receiver sampling unit. Further, whereas interpolation circuitry is often used to provide synchronization, certain embodiments of synchronous mode tracking systems circumvent any need for interpolation circuitry.

Having summarized certain features of an embodiment of synchronous mode tracking systems, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring to FIG. 1, shown is a block diagram of an example communication device 100 in which an embodiment of a synchronous mode tracking system may be employed. One having ordinary skill in the art should appreciate in the context of the present disclosure that other systems where synchronization of the sampling of multiple signals are contemplated, and hence FIG. 1 is merely for illustrative purposes, with other variations contemplated to be within the scope of the disclosure. For instance, though depicted with receiver functionality, it should be appreciated that transmitter functionality may also be employed, though omitted here for purposes of brevity and clarity. The communication device 100 in this example comprises plural (e.g., two (2)) receivers 102A and 102B similarly configured, though not limited to similarity in architecture nor limited to a quantity of two receivers. A first receiver 102A comprises an antenna 104A, radio frequency (RF) front end unit 106A, resampling unit 108A, channel estimation unit 110A, equalization (EQ) unit 112A, and post EQ processing unit 114A. A second receiver 102B likewise comprises an antenna 104B, RF front end unit 106B, resampling unit 108B, channel estimation unit 110B, equalization (EQ) unit 112B, and post EQ processing unit 114B. In some embodiments, fewer receiver front ends may be implemented, or in some embodiments, more front ends may be used. Each of the aforementioned units may be implemented in hardware, software, or a combination of both (generally and collectively referred to herein also as circuitry). In addition, though shown as separate units, in some embodiments, functionality of two or more of the aforementioned units may be combined.

Since the receiver 102B is similar to the receiver 102A, discussion of each component in receiver 102B in association with FIG. 1 will be omitted, with the understanding that the description of the units of the receiver 102A similarly applies to the units of the receiver 102B except where noted below. The RF front end unit 106A comprises circuitry for receiving, filtering, strengthening signals, and converting signals (e.g., converting analog signals to digital signals, mixing (e.g., downconverting), etc.) received over a channel via the antenna 104A. As is known, information is modulated in the received signal, and the same information in a given transmission may be communicated over different signals (e.g., different channels) due to different paths by each respective signal. The output of the RF front end unit 106A is provided to the resampling unit 108A, which in one embodiment comprises a sampling unit, registers, an accumulator (e.g., logic, such as an adder, and memory), and a delay lock loop as described further below. In some embodiments, the accumulator and/or delay lock loop are mirrored in the resampling unit 108B, and in some embodiments, the accumulator and/or delay lock loop are not mirrored in the resampling unit 108B. The resampling unit 108A receives processed digital samples from the RF front end unit 106A, and tracks the sampling by adjusting the sampling rate while feeding the sampling points to the accumulator to ensure synchronization in sampling by both the resampling units 108A and 108B, as explained further below. The channel estimation unit 110A determines channel conditions based on channel information received or determined based on certain channel parameters (e.g., bit error rate, signal to noise ratio, interference, etc.). The output of the channel estimation unit 110A is provided to the equalization unit 112A for providing known equalization functionality (e.g., decision feedback equalization, etc.), and then the output of the equalization unit 112A is provided to the post EQ processing unit 114A for further processing (e.g., combining, etc.).

As indicated above, the architecture shown in FIG. 1 is illustrative, and variations are contemplated to be within the scope of the disclosure, such as the combining of the functionality of one or more of the units between and/or within receivers 102A and 102B, among other variations, as should be appreciated by one having ordinary skill in the art.

Figure 2:
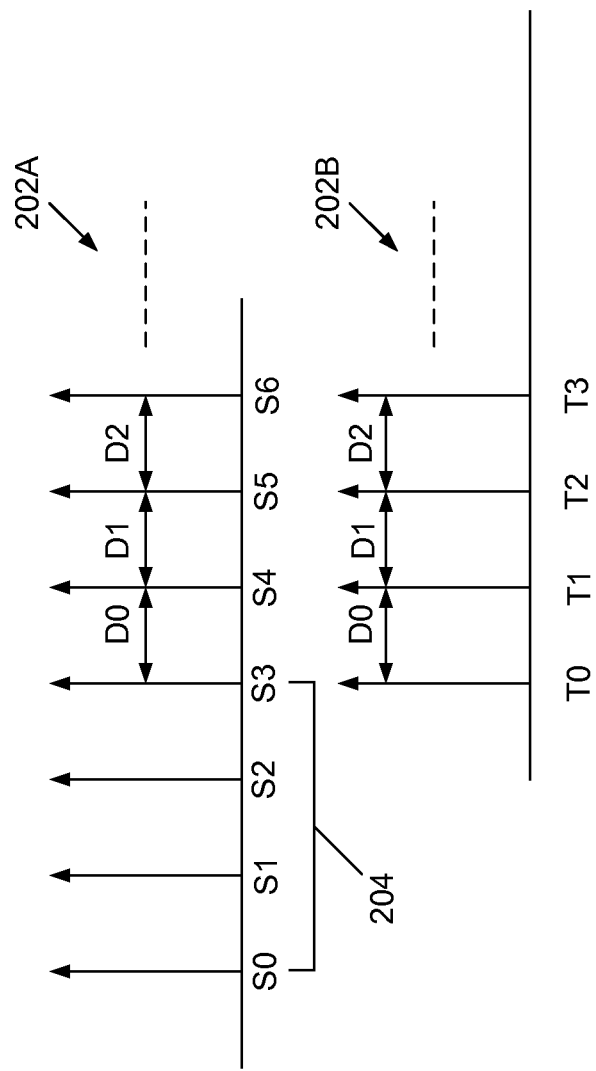
FIG. 2 is a schematic diagram that illustrates sampling of signals, derived from multipath signals received via multiple antennas, by an embodiment of a synchronous mode tracking system.

Having described an example environment in which an embodiment of a synchronous mode tracking system may be implemented, attention is directed to FIG. 2, which illustrates example sampling of signals derived from multipath signals received via multiple antennas. The first sampling string 202A, shown in an exaggerated, abbreviated form, corresponds to multipath signals with modulated information received via antenna 104A, and a second sampling string 202B (also in exaggerated, abbreviated form) corresponds to multipath signals with the modulated information received via antenna 104B. Referring to the first sampling string 202A, samples are taken by a sampling unit of the resampling unit 108A at sampling points S0, S1, S2, S3, etc. The sampling point S0 corresponds to an initial sampling point (e.g., when commencement of the sampling occurs) for the sampling unit of the resampling unit 108A. The sampling points are taken over one or more (e.g., cascaded) correlation windows (e.g., one shown 204) to assess the channel conditions, among other functions facilitated by a correlation window. During the sampling window 204, a determination may be made that channel conditions warrant enabling a second antenna 104B. In some embodiments, enabling of the second antenna 104B may be prompted by other conditions and/or parameters. For instance, the receiver 102A may determine that quality is declining for signals received over antenna 104A. At a time corresponding to T0 (e.g., corresponding to an initial, programmed sampling point for the sampling unit of the resampling unit 108B), the antenna 104B and the sampling unit of the resampling unit 108B may be enabled, resulting in commencement of sampling by the sampling unit of the resampling unit 108B.

For reasons explained further below, the sampling units for resampling units 108A and 108B sample the respective signals in a synchronous manner, wherein the sampling points T0, T1, T2, and T3 are respectively aligned with sampling points S3, S4, S5, and S6. Though shown with equal spaced sampling points (e.g., sampling intervals), the sampling intervals may vary by a value D (e.g., D0 may be different than D1, which may be different than D2, reflecting a possible difference in sampling intervals) based on an input from the delay lock loop residing in, or associated with, the receiver 102A. However, the sampling intervals of the first sampling string 202A are the same as the sampling intervals 202B of the second sampling string 202B once the sampling unit of the receiver 102B is enabled. For instance, the sampling point S3 is aligned with the corresponding sampling point T0, and the next sampling point S4 is aligned with the corresponding sampling point T1, and so on.

Figure 3:
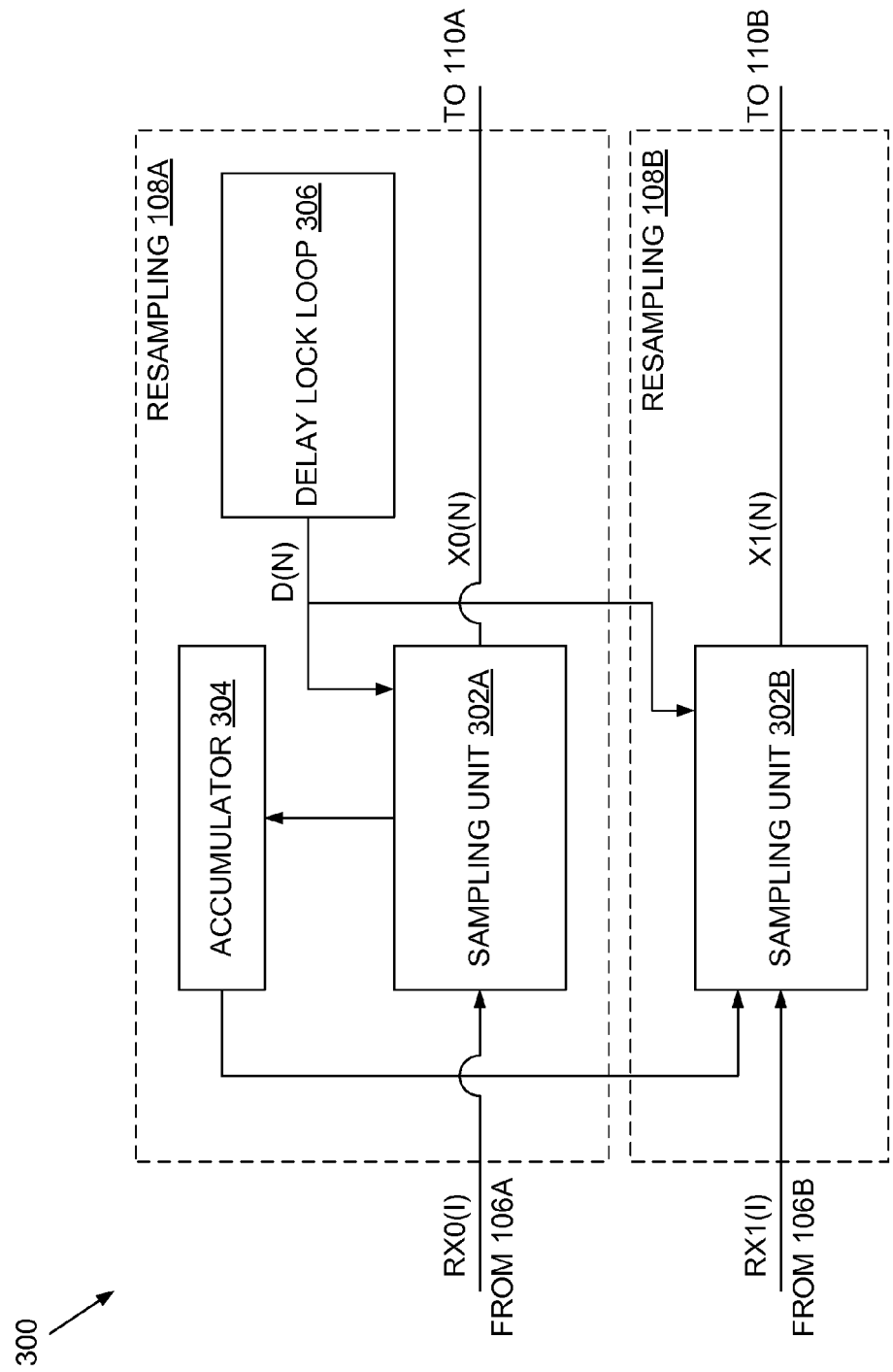
FIG. 3 is a block diagram that illustrates an embodiment of a synchronous mode tracking system.

The synchronization of the sampling units of the resampling units 108A and 108B is further described in association with FIG. 3, which illustrates an embodiment of a synchronous mode tracking system 300. One having ordinary skill in the art should appreciate in the context of the present disclosure that the synchronous mode tracking system 300 is merely for illustrative purposes, and that other variations with fewer or additional components (e.g., registers) are contemplated to be within the scope of the disclosure. The synchronous mode tracking system 300 depicted in FIG. 3 comprises components from receiver 102A and receiver 102B, and in particular, components from resampling units 108A and 108B. The components shown for respective receivers 102A and 102B in the synchronous mode tracking system 300 depicted in FIG. 3 may also be referred to herein as cluster path processor (CPP) pairs, with the receiver 102A and the depicted components designated as the master CPP and the receiver 102B and the depicted component designated as the slave CPP, as explained later in association with FIGS. 4-5. Note that in some embodiments, other arrangements of components may comprise the CPP pairs. For instance, the CPP may be part of an estimation unit in some embodiments. The synchronous mode tracking system 300 comprises sampling units 302A and 302B, an accumulator 304, and a delay lock loop 306. In some embodiments, one or more registers (not shown) may be incorporated in, or associated with, the synchronous mode tracking system 300 as should be appreciated by one having ordinary skill in the art in the context of the present disclosure.

The sampling unit 302A, accumulator 304, and delay lock loop 306 are components residing in the resampling unit 108A, whereas the sampling unit 302B resides in the resampling unit 108B. The sampling unit 302A receives processed signals (e.g., ADC samples, referred to as RX0($i$), where i is an integer value) from RF front end unit 106A, and samples the processed, digitized signals at sampling points determined by the delay lock loop 306. In other words, the delay lock loop 306 feeds the sampling unit 302A with a sampling adjust signal, D(N) (where N is an integer value), the signal D(N) adjusting the sampling interval based on, for instance, channel conditions (e.g., changes in the maximum signal power location, etc.).

The accumulator 304 receives the sampling points from the sampling unit 302A and determines the difference between successive sampling points. The accumulator 304 accumulates the difference between successive sampling points. For instance, for one thousand samples, T0, T1, T2, ... T999, the sampling points may be at 0, 0.98, 2.01, etc. The difference between sampling points T0 and T1 is 0.98, and the difference between sampling points T1 and T2 is 1.03, and so on. In other words, the sampling points Ti is equal to the accumulator value (the accumulated difference) plus a sampling interval adjust value, which may be expressed formulaically as:

$$Ti = Acc(i) + D(i),$$

where Acc is the accumulated differences value and D is the sampling interval adjust value, and i is an integer value (e.g., 0, 1, 2, etc.).

The accumulated value is fed to the sampling unit 302B at a time corresponding to the programmed initial sampling point, which (along with other receiver components, such as antenna 104B) is enabled by the receiver 102B based on channel conditions detected by the receiver 102A. In some embodiments, the accumulator value may be expressed as an integer part and a fractional part to facilitate tracking. The receiver 102A may detect a decline in signal strength or increase in interference or fading, and enable (e.g., activate) the processing hardware and/or software of the receiver 102B. Accordingly, the sampling unit 302B commences sampling in synchronization with the sampling by the sampling unit 302A based on receiving the accumulated value from the accumulator 304 and based on input from the delay lock loop 306 (e.g., D(N)), according to the programmed initial sampling point. That is, the desired initial sampling point may be programmed into registers of the synchronous mode tracking system 300, as is explained further below. Sampled values X0(N) and X1(N) from sampling units 302A and 302B, respectively, are output thereafter in synchronization according to the adjustable sampling interval values D(N) provided to both units by the delay lock loop 306 and provided to the channel estimation units 110A and 110B for further processing in known manner.

One example synchronous mode tracking method may be described using a time varying signal, S0($t$) (though in some embodiments, the received signal at the sampling unit is digitized), where t equals zero to infinity. For instance, the sampling unit 302A receives S0($t$), and samples the same at T(i)=Ts+D(i), where D(i) is the output of the delay lock loop 306, and i is an integer greater than or equal to 0. The output of the sampling unit 302A comprises X0(N), where i=N. The accumulated value Acc(i)=Acc (i−1)+D(i). Then, the receiver 102B is enabled at t=t0, where t0 is greater than the initial sampling point of the sampling unit 302A. The starting point (commencement) of the sampling unit 302B is initialized to Acc(t0), and the initial sampling point is equal to Acc(i)+iTs to enable synchronization with the sampling unit 302B. The delay lock loop 306 then drives the sampling of both the sampling units 302A and 302B.

As mentioned above, the synchronous mode tracking system 300 may be divided into a master CPP and a slave CPP, terms which will be used hereinafter for FIGS. 4-5 for brevity. Recapping from above, the synchronous mode tracking system 300 may be configured to operate in a synchronous mode where a correlation window of a given size (e.g., sixteen (16) tap) from a slave CPP is exactly aligned with the timing of a master CPP. The CPP pairs to be aligned share a common delay lock loop (e.g., delay lock loop 306), and are programmed to start together using plural registers. For instance, one register, referred to herein as a synchronous mode master, includes a field that indicates what CPP pair timing should be used as a reference for the CPP pair. Another register, referred to as a synchronous mode enable, provides the targeted initial sampling point for the slave CPP, and hence enables the slave CPP and further enables commencement of sampling following a slot boundary after the enable as been programmed.

Figure 4:
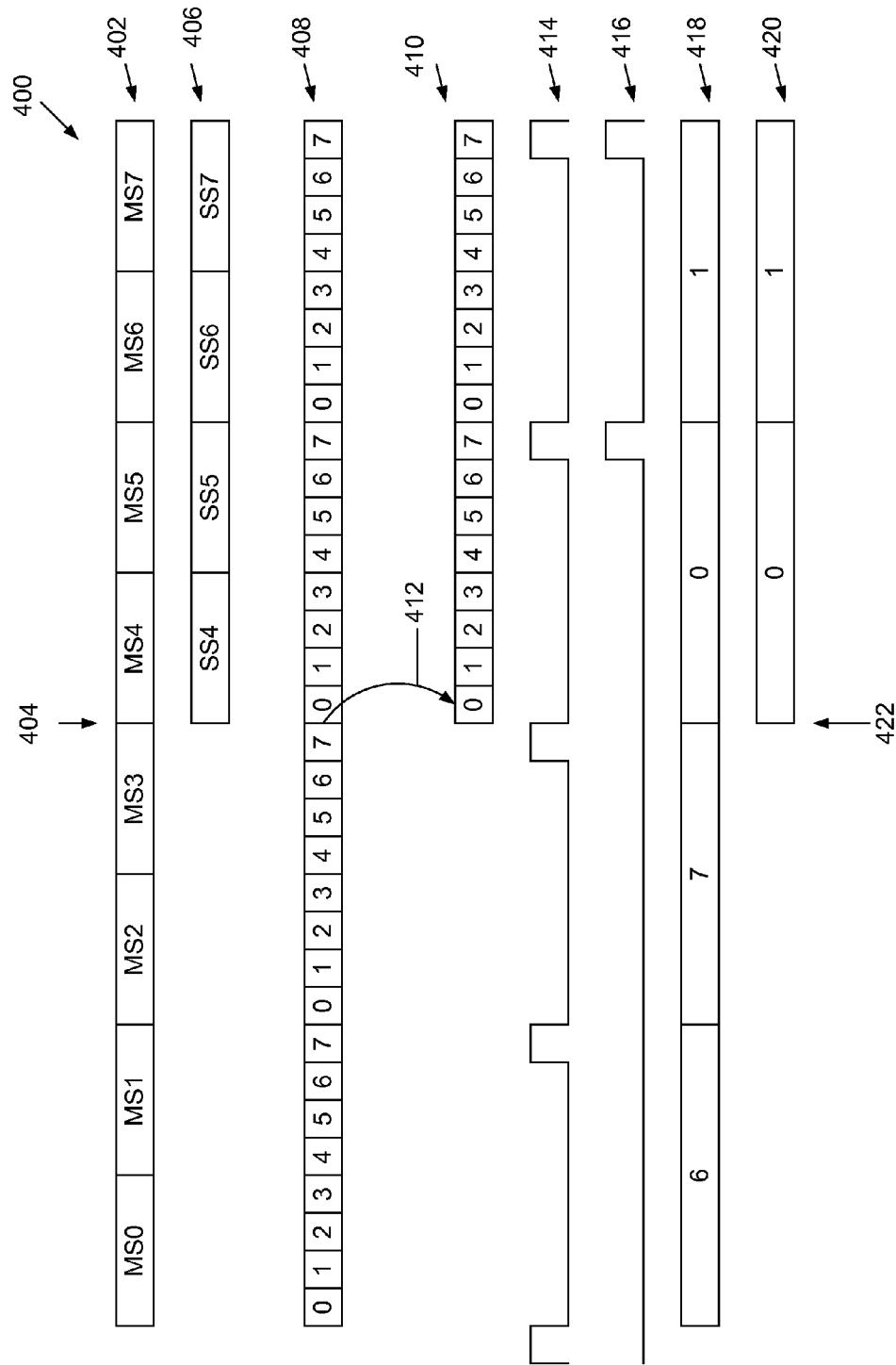
FIG. 4 is a combined schematic-timing diagram that illustrates one embodiment of a synchronous mode method.

For instance, referring to FIG. 4, shown is a combined schematic-timing diagram 400 that illustrates an embodiment of a synchronous mode tracking method. In particular, the diagram 400 illustrates a progression of Gold codes when a CPP pair is started in synchronous mode. As shown in FIG. 4, the master CPP samples the signal according to master slots 402 (e.g., master slot 0, master slot 1, etc.), and the slave CPP commences sampling following a slot boundary 404, as reflected by slave slots 406 (e.g., slave slot 4, slave slot 5, etc.). Also shown are a master timing accumulator MSB 408 and a slave timing accumulator MSB 410. As indicated above, some embodiments may include master and slave accumulators, and some embodiments may only utilize a master accumulator. In one embodiment, the exact timing of the master CPP in the master timing accumulator MSB 408 is also copied into the slave timing accumulator MSB 410, as symbolically represented by arrow 412. As depicted by the master cx2 timing waveform 414 and the slave cx timing waveform 417, sampling by both sampling units of the CPP pair continue as a locked pair. The master gold code 418 and slave gold code 420 are shown with the example progression (e.g., master comprises 6, 7, and then restarts at 0, then 1, whereas the gold codes of the slave start at 0 and advance to 1, etc.). As shown by reference line 422, the slave gold code starts in synchronization with the master gold code.

Figure 5:
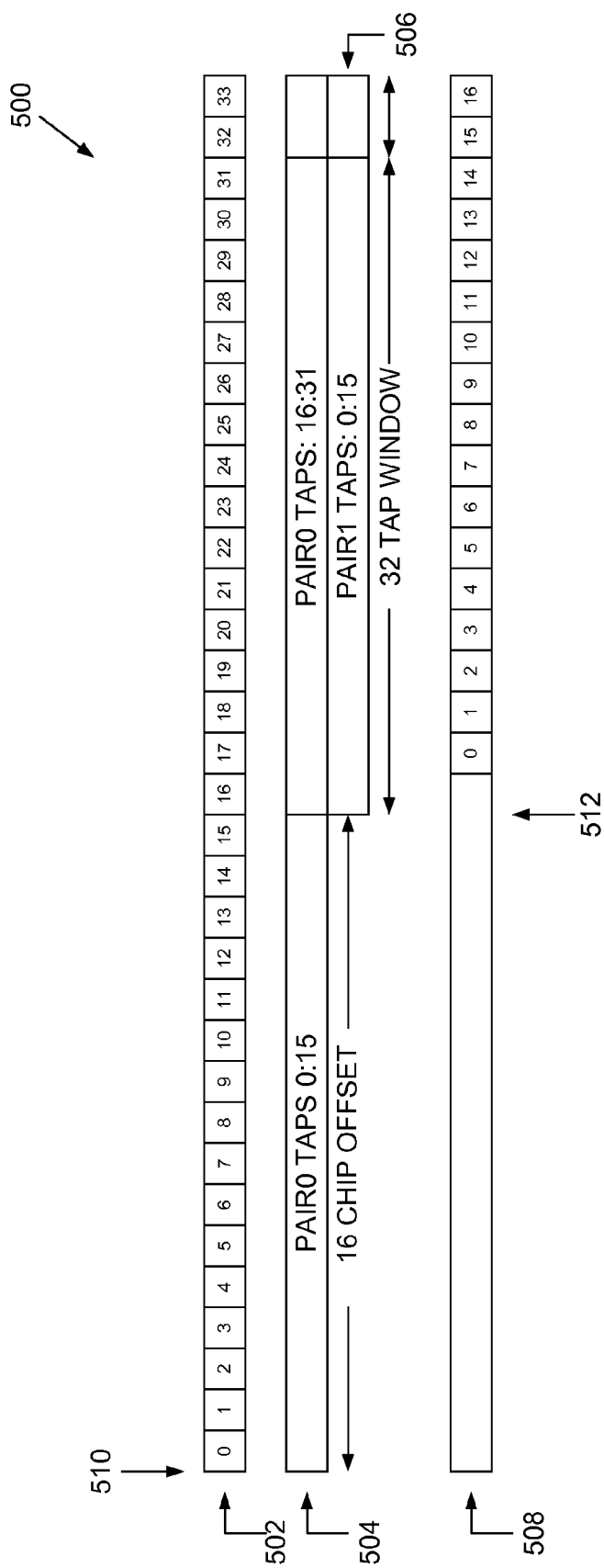
FIG. 5 is a combined schematic-timing diagram that illustrates one embodiment of a synchronous mode method operating in extended mode.

FIG. 5 is a combined schematic-timing diagram 500 that illustrates one embodiment of a synchronous mode method operating in extended mode. From the discussion above, each CPP of the CPP pair operates independently on a defined chip window (e.g., sixteen (16) chips). An extended mode enables any number of CPP windows to be cascaded to form a longer, coherent correlation window. Similarly to that described for a single correlation window, the CPP pairs share a common delay lock loop (e.g., delay lock loop 306) and are programmed to start together using extended mode registers. For instance, one register, referred to as an extended mode master, includes a field that indicates what CPP pair timing should be used as a reference for the CPP pair. One of the CPP pairs becomes the slave, and the master then should not have the extended mode enabled. Another register, referred to as an extended mode offset, provides the delay (e.g., in chips) to start the second CPP pair in the chain. For instance, the delay may be a multiple of sixteen (16) chips since the correlation window of each CPP is sixteen (16) chips. Referring to FIG. 5, the diagram 500 illustrates PAIR0 gold codes 502, the corresponding pair taps 504, and PAIR1 taps 506, and the PAIR1 gold codes 508. It should be appreciated that the right-hand side of FIG. 5 is truncated, and that the PAIR0 and PAIR1 gold codes and the PAIR0 and PAIR1 taps extend beyond those shown in FIG. 5. The PAIR0 starting point is represented by arrow 510, and the PAIR1 starting point is indicated by arrow 512.

The diagram 500 in FIG. 5 illustrates the progression of gold codes (e.g., PAIR0 gold codes 502 and PAIR1 gold codes 508) when a CPP pair is started in extended mode. PAIR1 points to PAIR0 as the extended mode master with an offset of sixteen (16) chips. In the extended mode, the serving cell master is configured as the CPP within the extended chain, since a dispreading operation from the first CPP (of the CPP pair) is done prior to the last CPP (of the CPP pair) and hence it is desirable to capture all the results together. In some embodiments, delay lock loop adjustments are disabled in the extended mode for the duration of the first slot to enable the chained CPPs to start correctly. In some embodiments, the extended mode enables up to six (6) 32-chip windows if the CPP units are configured as pairs. In some embodiments, longer window sizes are enabled in multiples of sixteen (16) if the CPPs are all chained together (e.g., 16, 32, 48, 64, 80, 96, 112, 128, 144, 160, 172).

Figure 6:
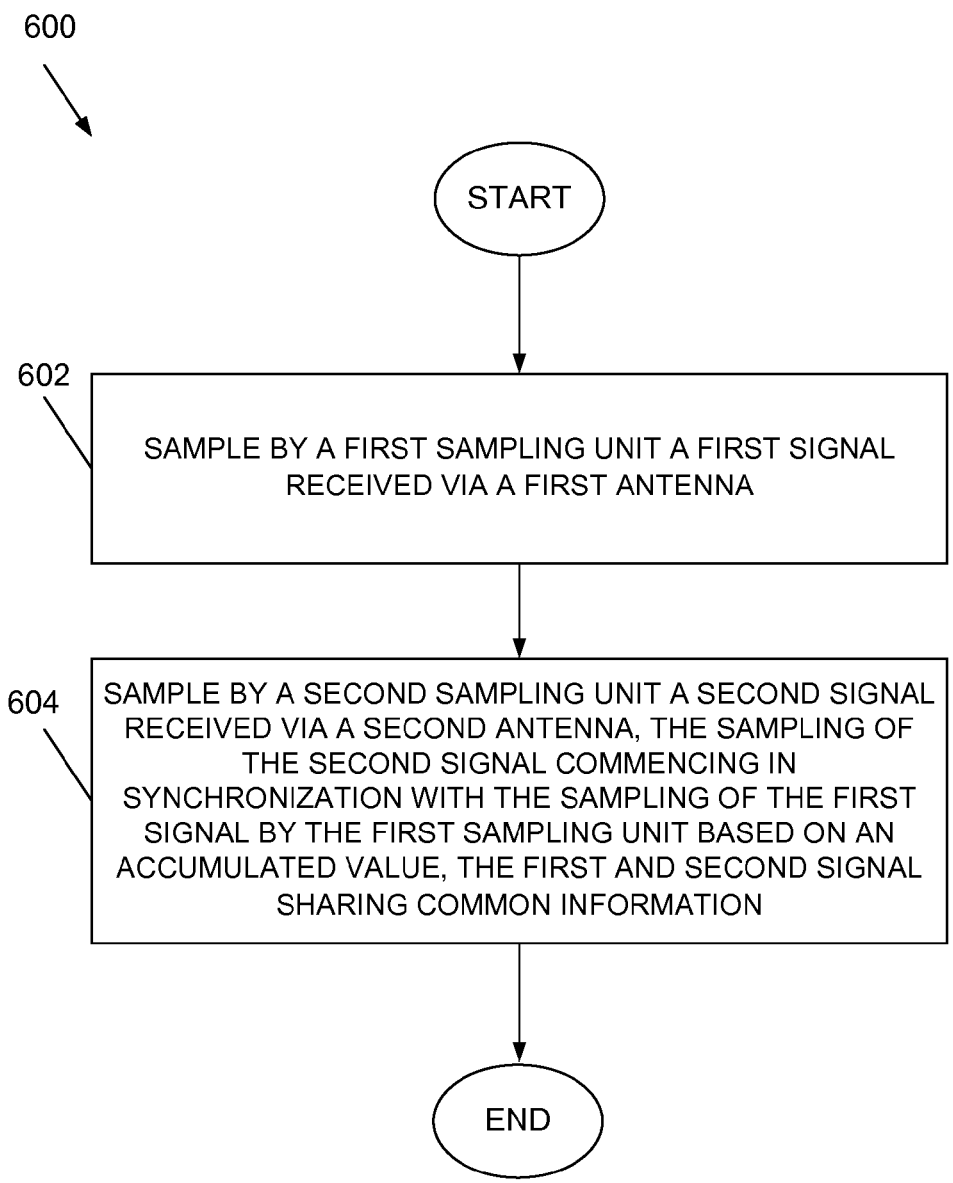
FIG. 6 is a flow diagram that illustrates one embodiment of synchronous mode tracking method.

It should be appreciated within the context of the present disclosure that one embodiment of synchronous mode tracking method 600, depicted in FIG. 6, comprises sampling by a first sampling unit 302A a first signal received via a first antenna 104A (602), and sampling by a second sampling unit 302B a second signal received via a second antenna 104B, the sampling of the second signal commencing in synchronization with the sampling of the first signal by the first sampling unit 302A based on an accumulated value, the first and second signal sharing common information. The second sampling unit 302B (and possibly other components of the receiver 102B) may be in a sleep mode while the first sampling unit 302A is sampling the signal (i.e., prior to the initial, programmed sampling point of the second sampling unit 302B). In one embodiment, the method 600 accumulates differences in successive sampling points of the first sampling unit to derive the accumulated value, wherein the sampling of the second signal commences at an initial sampling point according to the accumulated value and based on receiving an input from a delay lock loop. The sampling by the first and second sampling units of the first and second signals, respectively, occur at aligned sampling points after the commencement in sampling by the second sampling unit according to a delay lock loop value and the accumulated value. In some embodiments, the method 600 includes sampling by the first sampling unit either during a first sampling window of a defined duration or during a plurality of back-to-back sampling windows comprising a multiple of the defined duration prior to the commencement of sampling by the second sampling unit, wherein the sampling by the second sampling unit commences at a time coinciding with an end of either the window or windows based on the accumulated value and a delay lock loop value.

The synchronous mode tracking system 300 may be implemented in hardware, software (e.g., including firmware), or a combination thereof. In one embodiment(s), the synchronous mode tracking system 300 is implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In embodiments, where all or a portion of the synchronous mode tracking system 300 is implemented in software, the software is stored in a memory and that is executed by a suitable instruction execution system.

Any process descriptions or blocks in flow diagrams should be understood as representing modules, segments, or portions of code which include one or more executable instructions for implementing specific logical functions or steps in the process, and alternate implementations are included within the scope of the disclosure in which functions may be executed out of order from that shown or discussed, including substantially concurrently or in reverse order, depending on the functionality involved, as would be understood by those reasonably skilled in the art.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A system, comprising:
   an accumulator;
   a first sampling unit configured to sample a first signal beginning with a first initial sampling point, the first signal having information;
   a second sampling unit configured to sample a second signal having the information, the second sampling unit configured to be synchronized with the first sampling unit at a second initial sampling point that follows the first initial sampling point based on input from the accumulator; and
   a delay lock loop configured to drive a sampling rate of the first and second sampling units after the second initial sampling point.

2. The system of claim 1, wherein prior to the second initial sampling point, the first and second sampling units are configured to operate independently of one another.

3. The system of claim 1, further comprising a first antenna associated with the first sampling unit and a second antenna associated with the second sampling unit.

4. The system of claim 3, wherein the second antenna is configured to activate based on channel conditions associated with the first antenna.

5. The system of claim 1, wherein the first and second sampling units are configured to sample the first and second signals, respectively, at aligned sampling points after the second initial sampling point.

6. The system of claim 1, wherein the delay lock loop is configured to adjust the sampling rate over time.

7. The system of claim 6, wherein the first and second sampling units are configured to sample the first and second signals synchronously throughout the adjustments of the sampling rate.

8. The system of claim 1, wherein the accumulator is configured to accumulate differences in successive sampling points of the first sampling unit, and wherein the second sampling unit is configured to begin sampling at the second initial sampling point according to a first value corresponding to the accumulated differences and based on input from the delay lock loop.

9. The system of claim 8, wherein a sampling point subsequent to the second initial sampling point is based on the first value and a second value from the delay lock loop.

10. The system of claim 8, wherein the first value comprises an integer portion and a fractional portion.

11. The system of claim 1, wherein the second sampling unit is sleeping prior to the second initial sampling point.

12. The system of claim 1, wherein respective outputs of the first and second sampling units are combined.

13. The system of claim 1, wherein the first sampling unit is configured to sample the first signal either during a first sampling window of a defined duration or during a plurality of back-to-back sampling windows comprising a multiple of the defined duration prior to the second initial sampling point depending on channel conditions.

14. The system of claim 13, wherein the second sampling unit is configured to sample the second signal at the second initial sampling point that coincides with an end of either the window or windows based on the input from the accumulator.

15. A method, comprising:
sampling by a first sampling unit a first signal received via a first antenna; and
sampling by a second sampling unit a second signal received via a second antenna, the sampling of the second signal commencing in synchronization with the sampling of the first signal by the first sampling unit based at least on an accumulated value, the accumulated value derived from accumulating differences in successive sampling points of the first sampling unit, the first and second signal sharing common information.

16. The method of claim 15, wherein the sampling of the second signal commences at an initial sampling point according to the accumulated value and based on receiving an input from a delay lock loop.

17. The method of claim 15, wherein the sampling by the first and second sampling units of the first and second signals, respectively, occur at aligned sampling points after the commencement in sampling by the second sampling unit according to a delay lock loop value and the accumulated value.

18. The method of claim 15, wherein the sampling by the first sampling unit occurs either during a first sampling window of a defined duration or during a plurality of back-to-back sampling windows comprising a multiple of the defined duration prior to the commencement of sampling by the second sampling unit, wherein the sampling by the second sampling unit commences at a time coinciding with an end of either the window or windows based on the accumulated value and a delay lock loop value.

19. A system, comprising:
a delay lock loop configured to provide a sampling adjust signal;
plural antennas;
a first sampling unit, the first sampling unit configured to sample a first multipath signal received via a first of the plural antennas according to the sampling adjust signal;
an accumulator configured to store accumulated differences in sampling points associated with the sampling of the first multipath signal; and
a second sampling unit configured to sample a second multipath signal received via a second of the plural antennas, the sampling of the second multipath signal commencing in synchronization with the sampling of the first signal by the first sampling unit based on an accumulated value corresponding to the accumulated differences and the sampling adjust signal.

* * * * *